(12) United States Patent
Bittman

(10) Patent No.: US 12,376,563 B2
(45) Date of Patent: Aug. 5, 2025

(54) GROOMING ASSISTANCE DEVICE

(71) Applicant: Eric Warren Bittman, Woodcliff Lake, NJ (US)

(72) Inventor: Eric Warren Bittman, Woodcliff Lake, NJ (US)

( * ) Notice: Subject to any disclaimer, the term of this patent is extended or adjusted under 35 U.S.C. 154(b) by 24 days.

(21) Appl. No.: 18/514,430

(22) Filed: Nov. 20, 2023

(65) Prior Publication Data

US 2025/0160297 A1 May 22, 2025

(51) Int. Cl.
*A01K 13/00* (2006.01)
*A01K 5/01* (2006.01)
*A42B 1/24* (2021.01)

(52) U.S. Cl.
CPC ............ *A01K 13/00* (2013.01); *A01K 5/0114* (2013.01); *A42B 1/24* (2013.01)

(58) Field of Classification Search
CPC ...... A01K 13/00; A01K 5/0114; A01K 5/026; A42B 1/24
See application file for complete search history.

(56) References Cited

U.S. PATENT DOCUMENTS

| | | | | |
|---|---|---|---|---|
| 5,070,545 A | * | 12/1991 | Tapia | A42B 1/0184 2/171.1 |
| D325,941 S | * | 5/1992 | Bertrand | D21/493 |
| D336,969 S | * | 7/1993 | Mullendore | D2/866 |
| 6,643,847 B1 | * | 11/2003 | Dornak | A42B 1/0182 2/195.1 |
| D783,950 S | * | 4/2017 | Johnson | D2/891 |
| D801,642 S | * | 11/2017 | Johnson | D2/866 |
| D978,446 S | * | 2/2023 | Wendling | D30/121 |
| D1,015,648 S | * | 2/2024 | Zhu | D30/121 |
| D1,033,752 S | * | 7/2024 | Fang | D30/121 |
| 2017/0164676 A1 | * | 6/2017 | Henrickson | A42B 1/24 |
| 2018/0359991 A1 | | 12/2018 | Levin et al. | |
| 2019/0166799 A1 | * | 6/2019 | Werber | A01K 15/026 |

* cited by examiner

*Primary Examiner* — Ebony E Evans
(74) *Attorney, Agent, or Firm* — Mitchell Bittman

(57) ABSTRACT

A grooming assistance device and method is provided to assist a groomer in controlling an animal during grooming. The grooming assistance device has a headgear to be worn by the groomer, the headgear having a food holder attached thereto, the food holder has a front side configured to hold a food and positioned on the headgear so that it is accessible to the animal allowing the animal to eat the food on the food holder while the groomer is grooming the animal.

10 Claims, 6 Drawing Sheets

GROOMING ASSISTANCE DEVICE

FIELD OF THE INVENTION

This invention relates to the field of grooming animals, particularly dogs, using grooming assistance device to provide a food treat to occupy and calm the animal during grooming.

BACKGROUND OF THE INVENTION

The prior art discloses various food holders for animals. US Publication 2018/0359991 discloses a container with a surface to hold food wherein the container is attached to a support surface which is mounted in a number of different ways employing, for example, suction cups, screws, hooks and the like. This food holder can be used as a distraction device when bathing or grooming an animal. However, this food holder does not maintain the groomer in close and intimate contact with the animal to allow the groomer to effectively carry out the grooming.

SUMMARY OF THE INVENTION

A grooming assistance device for grooming an animal by a groomer is provided having a headgear to be worn on the head of a groomer, the headgear having a food holder attached thereto, with the food holder having a front side configured to hold food and positioned on the headgear so that it is accessible to the animal allowing the animal to eat the food on the food holder while the groomer is grooming the animal.

A method for grooming an animal is provided by: placing a grooming assistance device onto the head of a groomer, the device comprising a headgear to be worn on the head of the groomer and a food holder attached to the headgear, with the food holder having a front side configured to hold a food and positioned on the headgear so that it is accessible to the animal allowing the animal to eat the food on the food holder while the groomer is grooming the animal; placing the food onto the food holder; and grooming the animal.

BRIEF DESCRIPTION OF THE DRAWINGS

It is noted that in the drawings like numerals refer to like components.

DETAILED DESCRIPTION OF THE INVENTION

Figure 1:
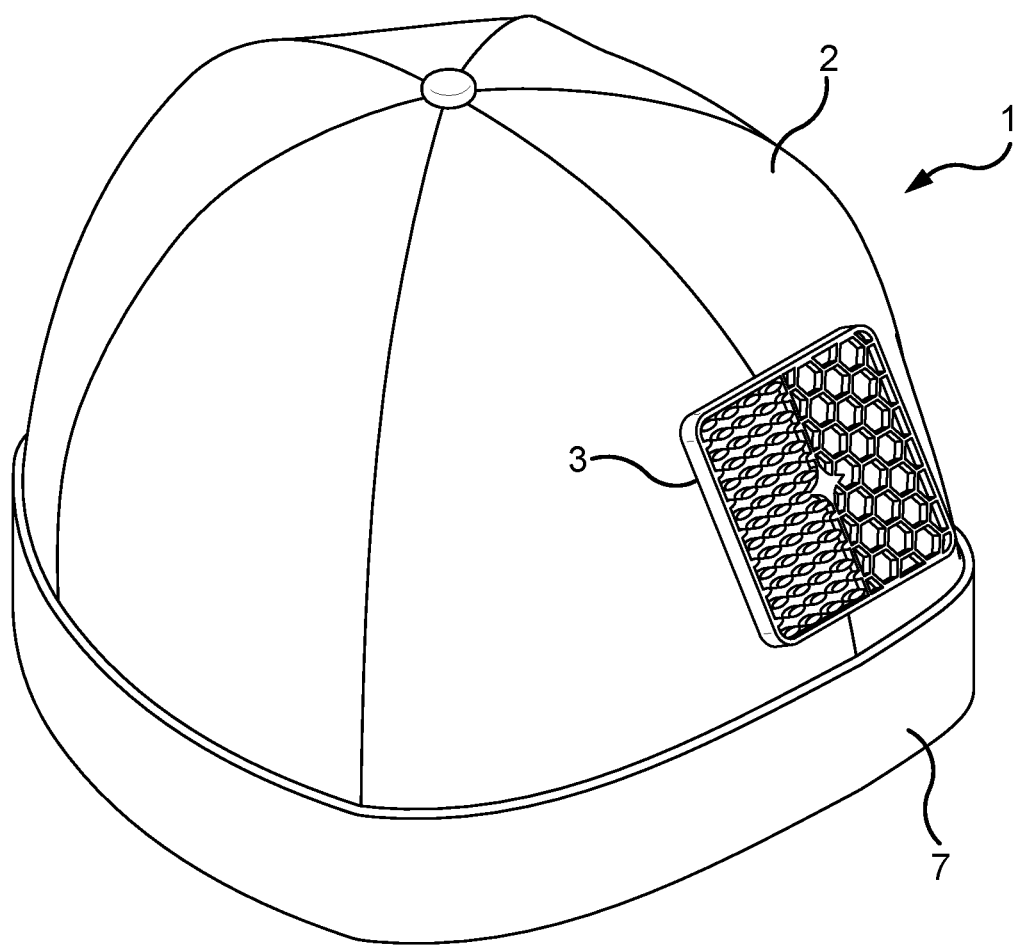
FIG. 1 is a prospective view of a grooming assistance device in an embodiment of this invention.
Figure 2:
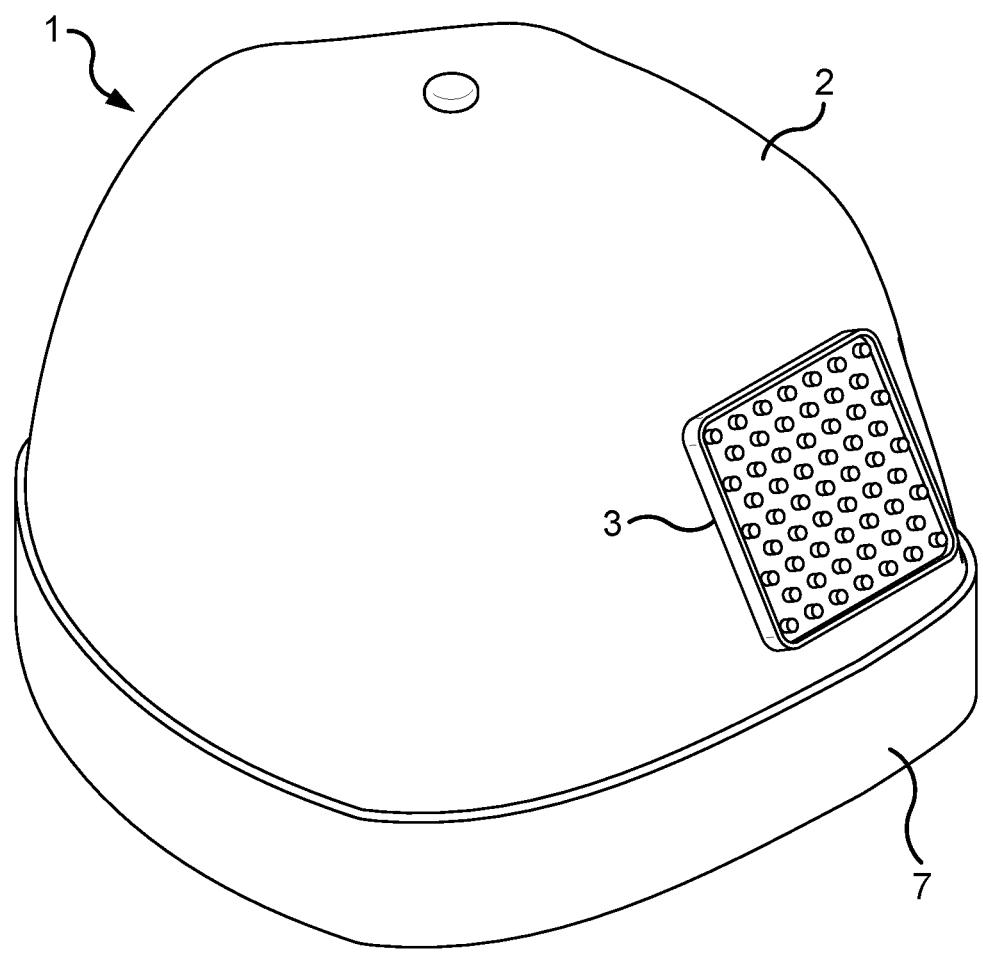
FIG. 2 is prospective view of the grooming assistance device with an alternate food holder.
Figure 8:
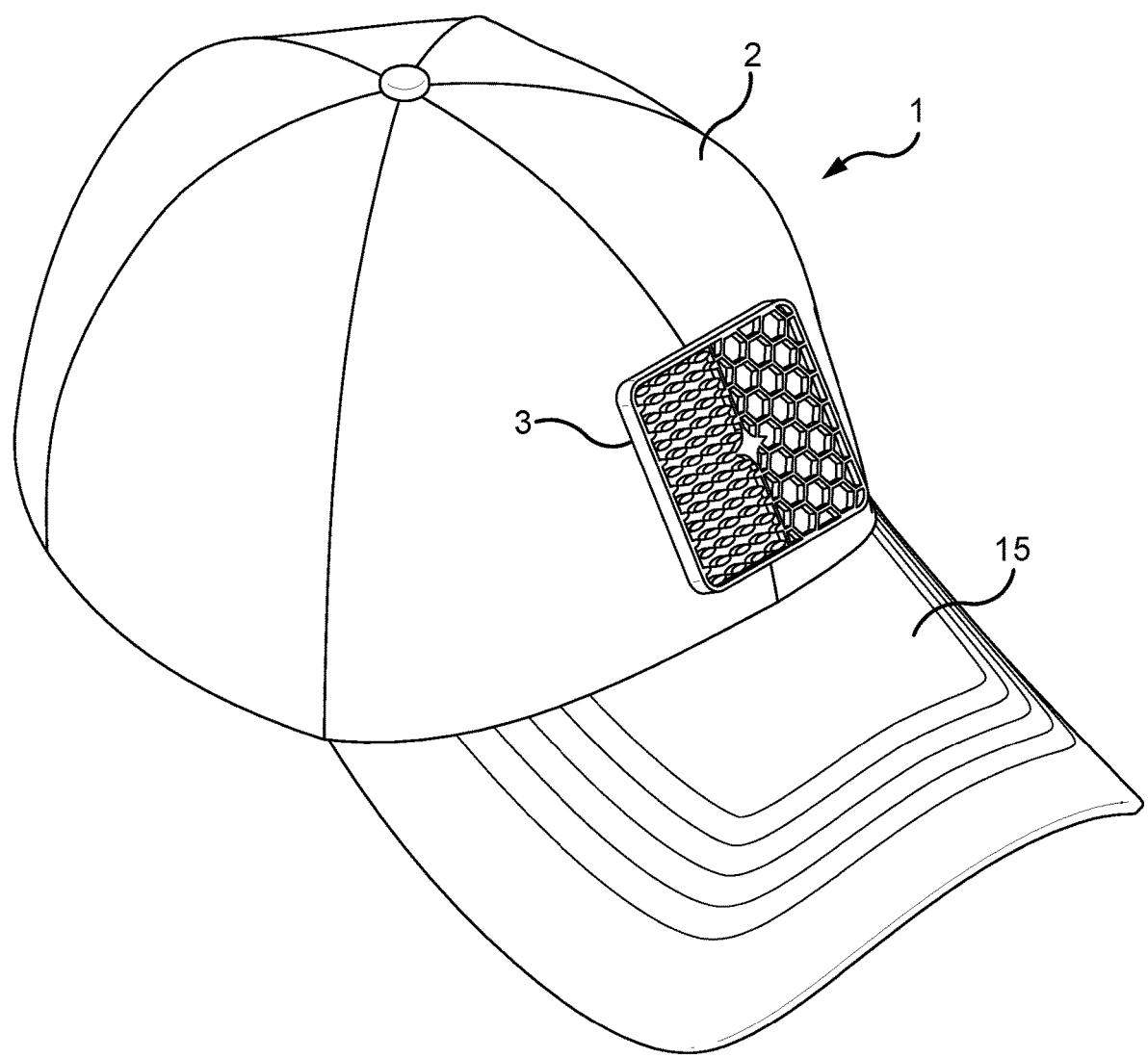
FIG. 8 is a prospective view of an alternate embodiment of the grooming assistance device of this invention.

Referring to FIGS. 1, 2 and 8, grooming assistance device 1, comprises a headgear 2 to be worn on a groomer's head and a food holder 3 affixed to the headgear 2. Food holder 3 has a front side 3a configured to hold food and positioned on the headgear 2 to be accessible to the animal to allow the animal to eat the food while the groomer is grooming the animal (see FIG. 5). While the animal eats the food from the front side (also referred to as a front surface) of the food holder, the animal is actively engaged in close proximity to the groomer allowing the groomer to groom the animal. With the animal eating the food this also has a calming effect on the animal, which calming effect continues even after the animal finishes the food. In addition, as the food (which can be a treat) is given to the animal this will foster goodwill between the groomer and the animal, making the grooming easier to carry out. This activity also contributes to training the animal to allow future grooming to take place with or without use of the grooming assistance device. If the animal is hard to manage after finishing the food, the groomer can always put more food on the front side of the food holder to help control the animal during the remaining grooming.

Figure 3:
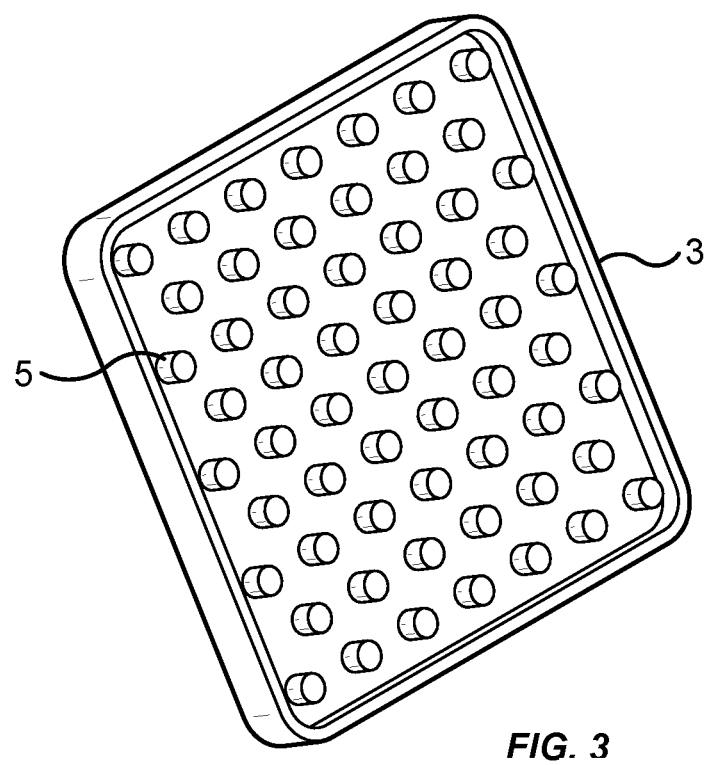
FIG. 3 is a prospective view of an alternative food holder.
Figure 4:
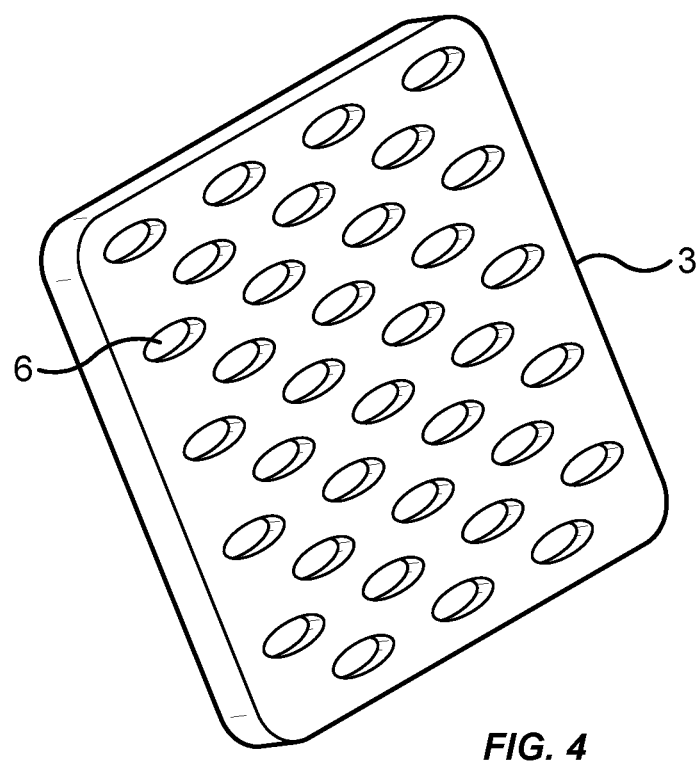
FIG. 4 is a prospective view of a further alternative food holder.

Food holder 3, which is affixed to the headgear 2, has a front side 3a which is configured to hold food during the grooming process. In an embodiment, as shown in FIG. 3, the front side 3a of the food holder 3 can have a plurality of protrusions 5 on the surface which help to hold the food onto the food holder. In an alternate embodiment, as shown in FIG. 4, the front side 3a of the food holder 3 can have a plurality of pockets and/or crevices 6 to help hold the food on the front side 3a of the food holder 3. Various alternative configurations may be used to help the food adhere onto the front side of the food holder. The food holder can be a licking pad to which a semi-solid paste, such as peanut butter, cheese spread, or a semi solid dog food is applied for the animal to lick off. The food holder can be constructed of any suitable material which can hold food on the front surface including, for example, a molded food grade plastic or rubber.

Figure 6:
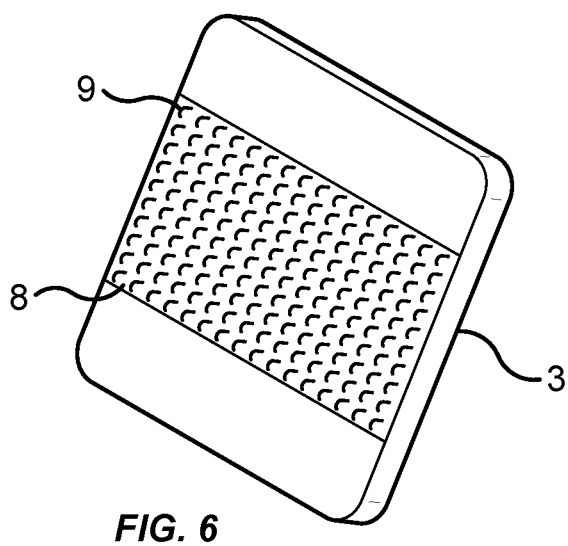
FIG. 6 is a prospective view of the back of a food holder with the back side having hooks for attachment to the loops on the headgear.
Figure 7:
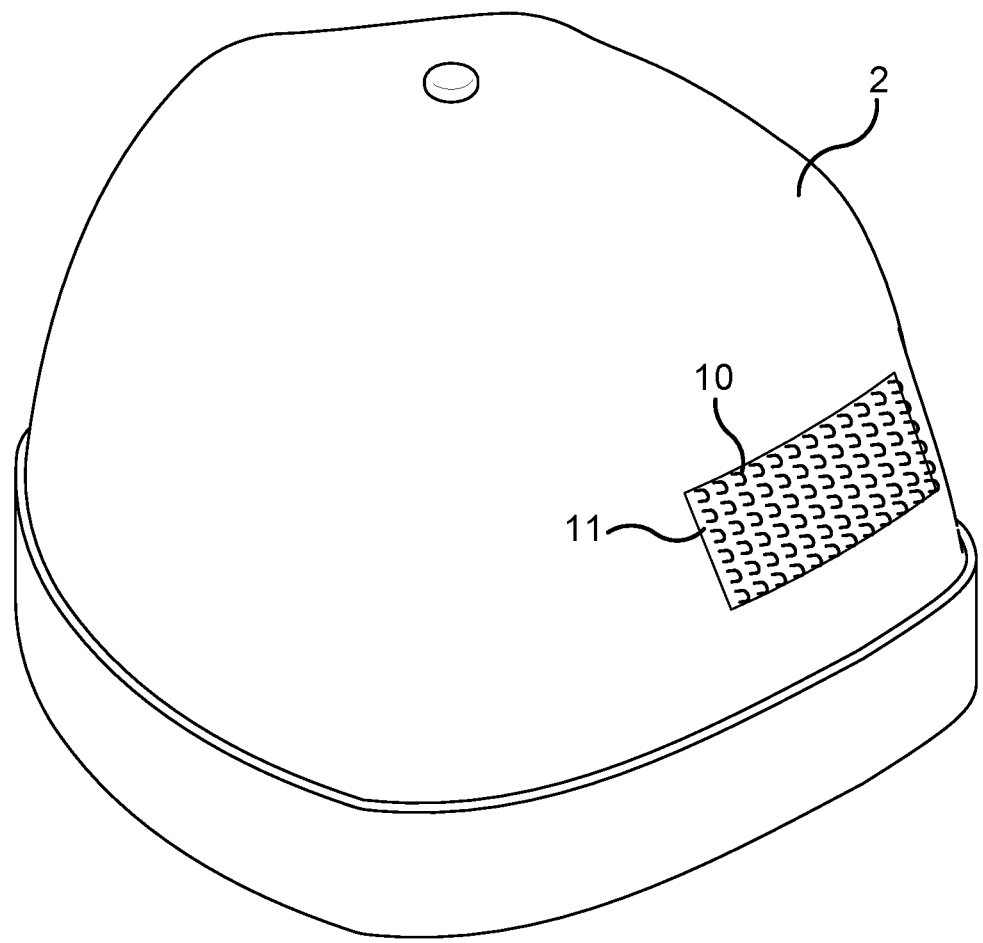
FIG. 7 is a prospective view of the headgear having a front surface area with loops for removable attachment to the hooks on the back side of the food holder of FIG. 6.

In an embodiment of this invention, as shown in FIGS. 6 and 7, the food holder 3 has a detachable attachment mechanism 9, with one part 9a of the detachable attachment mechanism on the back side 3b of the food holder 3 and the other part 9b of the detachable attachment mechanism on a front surface 11 of the headgear to enable detachment of the food holder 3 from the front surface 11 of the headgear 2. This will allow for cleaning or replacement of the food holder and for placement of the food on the front side 3a of the food holder 3. A suitable detachable attachment mechanism includes a hook and loop fastener, such as the VELCRO® brand fabric fastener, with one part of the fastener attached to the front surface of the headgear and the other part of the fastener attached to the back side of the food holder. As illustrated, FIG. 6 is a view of the back of a food holder 3 with the back side 3b of the food holder having hooks 9a for removable attachment to the loops 9b on a front surface 11 of the headgear 2, as shown in FIG. 7. An alternative detachable attachment mechanism 9 includes a snap fastener with a pair of interlocking discs, made from plastic or metal, with one interlocking disc attached to the front surface 11 of the headgear 2 and the other interlocking disc attached to back side 3b the food holder 3. While a detachable attachment mechanism is described, the food holder can also be permanently attached to the headgear where removal or replacement of the food holder is not needed, such as for a single use grooming assistance device. This may be suitable for veterinary applications to avoid spreading germs from one animal to another.

The headgear is designed to fit onto the groomer's head. The headgear can be a hat 2, as shown in FIGS. 1, 2, 5, 7 and 8. Various hat configurations can be used. As shown in FIGS. 1, 2, 5 and 7 a hat is one embodiment is Illustrated having a dome shape without a brim (bill). As further illustrated in FIG. 8, a hat with a brim 15 can also be used with the food holder being attached to the front surface of dome of the hat 2 or the top surface of the brim 15. As shown in FIG. 1, hat 2 can have a band 7 which can be adjustable to fit on various head sizes. As further shown in FIG. 8, the hat can have a strap 8 configured to fit under the chin of the groomer which can also be adjustable. A strap and/or band can be used to secure the headgear to the groomer's head so it will remain in place while the animal is eating the food. The hat can be constructed of various suitable materials including a soft, flexible fabric or a stiff material which will hold a shape.

Figure 5:
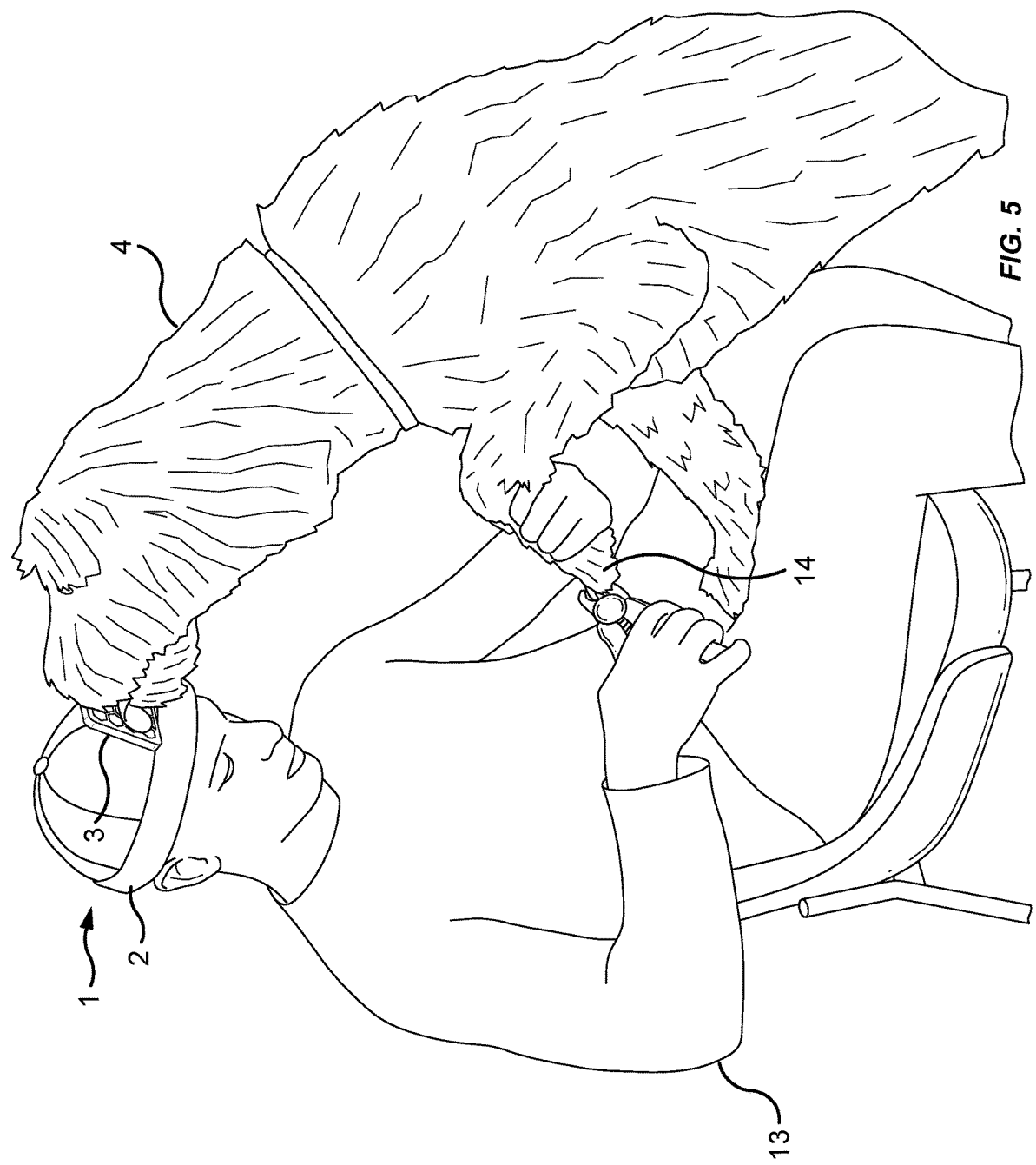
FIG. 5 is an illustration of the embodiment of FIG. 1 showing the grooming assistance device in use to groom a dog.

The animal as shown in FIG. 5 can be a dog 4. Many dogs are uncomfortable or resistant to grooming. With the grooming assistance device of this invention the dog is preoccupied, calmed, and distracted while eating the food from the front surface of the food holder allowing the groomer to be in close proximity and intimate contact with the dog to facilitate grooming (see FIG. 5). Depending on the size of the animal, the groomer can be positioned in a sitting or standing position and the animal can be on a chair or table or simply on its hind legs presenting its front paws to the groomer. FIG. 5 illustrates a grooming assistance device 1 on the head of a groomer 13 in a sitting position with a large dog 4 on its hind legs presenting its front paws 14 to the groomer 13 while licking the food from the surface of the food holder 3, allowing the groomer to clip the nails of the dog.

Use of the grooming assistance device of this invention also helps to establish trust between the groomer and the dog, as the dog, while eating, becomes accustomed to the groomer and the grooming, and will generally allow grooming to continue even after the food is finished. If the dog is not cooperating after finishing the food on the food holder, more food can be added to the front surface of the food holder to allow grooming to continue. The food which is added to the front surface of the food holder is preferably a food spread with the consistency of a paste, with peanut butter being a favorite food and treat for a dog. Other foods include cheese and dog food paste. In this way the dog will eat the food by licking off the surface of the food holder, with the protrusions, indentations, crevices, and pockets helping to hold the food on the front surface of the food holder and slowing down the dog's consumption of the food.

The groomer who uses this grooming assistance device can be any individual who is grooming a dog and includes, but is not limited to, dog owners, grooming professionals, and veterinarians. Regarding the grooming activity, this refers to any operation or activity that needs to be conducted on a dog including, but not limited to nail clipping, nail polishing, washing, brushing, treatment of wounds and veterinarian injections.

Accordingly, the scope of the invention described above is hereby defined by the following claims.

What is claimed is:

1. A method of grooming an animal comprising:
placing a grooming assistance device onto a head of a groomer, the grooming assistance device comprising a headgear to be worn on the head of the groomer and a food holder attached to the headgear, the food holder having a front side configured to hold a food and positioned on the headgear so that it is accessible to the animal allowing the animal to eat the food on the food holder while the groomer is grooming the animal;
placing the food onto front side of the food holder; and
grooming the animal.

2. The method of claim 1 wherein the animal is a dog.

3. The method of claim 2 wherein the grooming comprises nail cutting, nail polishing, brushing, washing, treating wounds, or injections.

4. The method of claim 2 wherein the food comprises peanut butter, cheese or dog food paste.

5. The method of claim 1 wherein the headgear is a hat.

6. The method of claim 5 wherein the hat is secured to the head of the groomer using a band.

7. The method of claim 5 wherein the hat is secured to the head of the groomer using a strap.

8. The method of claim 1 wherein the food holder has a has a detachable attachment mechanism on a back side of the food holder and on a front surface of the headgear, so the food holder can be detached from the headgear to allow for cleaning of the food holder and placement of the food on the front side of the food holder.

9. The method of claim 8 wherein the detachable attachment mechanism is a hook and loop fastener.

10. The method of claim 8 wherein the detachable attachment mechanism is a snap fastener.

* * * * *